US012067302B2

(12) United States Patent
Poddar et al.

(10) Patent No.: US 12,067,302 B2
(45) Date of Patent: Aug. 20, 2024

(54) AUTOMATED CONTENT AND CONTEXT AWARE SPOT PRINT WORKFLOW

(71) Applicant: Adobe Inc., San Jose, CA (US)

(72) Inventors: Nipun Poddar, Noida (IN); Sumeet Khurana, New Delhi (IN); Rebecca Eleanor Hauser, San Jose, CA (US); Neha Pant, Pitampura (IN); Naveen Prakash Goel, Noida (IN); David Douglas Barnes, San Ramon, CA (US); Anas Lnu, New Delhi (IN); Amit Mittal, Noida (IN); Amit Gupta, Noida (IN); Abhishek Kumar Pandey, Noida (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 18/069,446

(22) Filed: Dec. 21, 2022

(65) Prior Publication Data

US 2024/0211181 A1    Jun. 27, 2024

(51) Int. Cl.
*G06F 15/00* (2006.01)
*G06F 3/12* (2006.01)
*H04N 1/60* (2006.01)

(52) U.S. Cl.
CPC .......... *G06F 3/1204* (2013.01); *G06F 3/1208* (2013.01); *G06F 3/1256* (2013.01); *H04N 1/6097* (2013.01)

(58) Field of Classification Search
None
See application file for complete search history.

(56) References Cited

U.S. PATENT DOCUMENTS

| 2007/0121131 A1* | 5/2007 | Hauser | G06K 15/1835 |
| | | | 358/1.9 |
| 2009/0237681 A1* | 9/2009 | Ferlitsch | G06T 15/005 |
| | | | 358/1.9 |
| 2020/0210117 A1* | 7/2020 | Miyasaka | G06F 3/1205 |
| 2020/0336622 A1* | 10/2020 | Kunimi | H04N 1/00482 |
| 2022/0126563 A1* | 4/2022 | Schwab | B41F 33/16 |
| 2022/0350550 A1* | 11/2022 | Takasaki | H04N 1/00469 |

\* cited by examiner

*Primary Examiner* — Mark R Milia
(74) *Attorney, Agent, or Firm* — FIG. 1 Patents

(57) ABSTRACT

Spot aware print workflow techniques and system are described. In an implementation, a digital document is received for printing that includes a plurality of objects. Spot functionality is detected as corresponding to a respective object based on object properties detected for the respective object. One or more spot planes for are generated based on the spot functionality and a determination is made of color values for the one or more spot planes, respectively, based on context data describing a context, in which, the one or more spot planes are to be printed. The spot planes having the color values are output for printing by a print mechanism.

20 Claims, 8 Drawing Sheets

1

AUTOMATED CONTENT AND CONTEXT AWARE SPOT PRINT WORKFLOW

BACKGROUND

Digital documents are consumable in a variety of different usage scenarios that include use of different device types, different types of operating systems that are executable by those devices, different types of applications that are executable via those operating systems, and so on. Further, printer devices that are tasked with printing the digital documents are configurable in a variety of ways, such as to support use of specialized inks in addition to those employed in typical usage scenarios, e.g., in addition to cyan, magenta, yellow, and key (black) ink for CMYK.

Conventional techniques utilized in order to take advantage of this increase in functionality, however, rely on manual interaction involving a significant number of tasks, which is tedious to the user and results in inefficient use of computing devices and printer devices that implement these techniques.

SUMMARY

Spot aware print workflow techniques and systems are described. In an implementation, a digital document is received for printing that includes a plurality of objects. Spot functionality is detected as corresponding to a respective object based on object properties detected for the respective object. One or more spot planes are generated to implement the respective object and a determination is made of color values for the one or more spot planes, respectively, based on context data describing a context, in which, the one or more spot planes are to be printed. The one or more spot planes having the color values are output for printing by a print mechanism.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
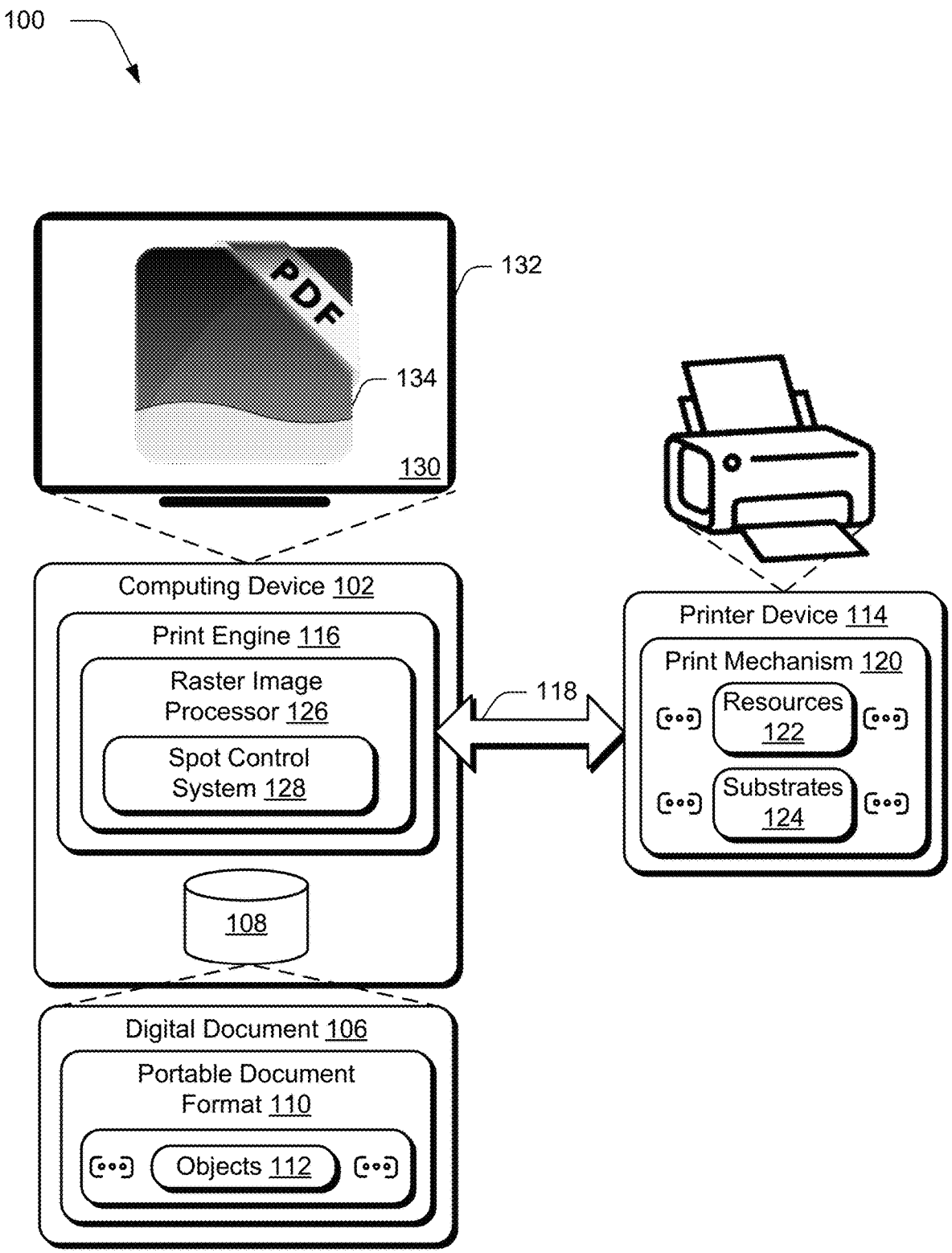
FIG. 1 depicts an example spot aware print workflow environment.

Digital documents are configurable to include a variety of object types having differing degrees of complexity. In typical scenarios, the objects are configured for rendering in conventional color spaces using conventional inks (e.g., cyan, magenta, yellow, and key (black) in a CMYK color space, etc.) using what is commonly referred to as "process colors."

A "spot" refers to functionality (e.g., a color space) associated with an object in the digital document that is independent of those inks used to produce process colors. In other words, spot functionality is dependent on specific functionality of a printer device "outside" of process colors. As such, a spot color involves inks on printing devices independent of those used to process colors. A specialized spot color includes spot colors used for specialized purposes, e.g., employs a specialized spot color such as gold, metallic foil, a varnish, and so forth. A specialized spot color, for instance, is usable to provide a white underlay usable as a bottom layer to make other colors printed on that underlay visible on a non-white or transparent substrate, varnish which is used to provide a glossy/matt effect and protect against damage, puff inks used to provide embosses, etc. As such, a spot is configurable in a variety of ways as implemented as specialized color space which is independent of those used to generate process colors. This includes scenarios in which the spot functionality does or does not directly contribute to a color in an intended result when printed. The spot functionality, for instance, is configurable to support special effects, materials, and so on as part of an object that do not behave in a same way as typical process colors, including how the spot combines with other colors, how the object responds to light, and so forth.

Consider a scenario in which a color is to be printed on a non-white substrate, e.g., a transparent substrate such as a drinking glass, a black substrate of a T-shirt, and so forth. In this scenario, the substrate has a direct effect on visibility of the color on the substrate, e.g., light passing through the glass can leak through to reduce visibility of the object, the black substrate changes color and reduces visibility of lighter colored inks when printed on the substrate, and so forth.

Conventional techniques to address these challenges, however, involve manual preprocessing of the document. In these conventional techniques, a designer is tasked with manually editing the digital document to provide information to avoid these visual artifacts. In real world scenarios, however, this involves an often tedious process to modify the digital document to implement functionality of each spot for a respective object in the digital document, which is especially challenging in scenarios involving complex digital documents. This also adds computational and communication overhead to a print pipeline tasked with printing the digital document and is dependent on a designer's skill and knowledge in order to be performed correctly, i.e., without visual artifacts. Further, this conventional technique involves changes to the digital document itself, which can result in an inability of the digital document, once edited, to be rendered as part of other printer pipelines that do not support this specialized functionality.

Accordingly, a spot aware print workflow is described that is configured to overcome these challenges. These techniques support automated spot processing which includes analyzing objects included in the digital document and a context provided by a printer device, e.g., specialized inks, substate information, printing functionality, and so forth. A spot control system, for instance, is incorporated in a printer pipeline as part of a raster image processor. As part of this, the spot control system is configurable to automatically implement spot functionality with corresponding color values for objects in a digital document which are eligible for spot generation. This is performable, for instance, by the spot control system during run time and in real time based on an object type and color space specified for the objects within the digital document and is configured to do so regardless of complexity or size of the digital document.

As such, the spot control system is also configurable to support specialized functionality supported by separate treatment of the spot functionality as part of an object from conventional process colors by leveraging this spot awareness. The spot control system also supports specialized functionality to configure the spot functionality, including control of a size of an underlying layer with respect to other spot planes, e.g., to support choke, spread, feather, or stroke operations. The spot control system is also configurable in support of preview functionality to leverage visual effects in order to recreate an appearance of the object having the spot functionality in a user interface, e.g., to provide a specialized appearance in a preview based on characteristics of inks and substrates to be used to print the object.

In one example, a digital document is received by a raster image processor (RIP) of a print engine for printing by a printer device. The print engine, for instance, is implemented by a computing device, by the printer device itself, and so forth. The digital document, in one example, is configured according to a portable document format and includes a plurality of objects to be rendered (i.e., rasterized) by the print engine.

A spot control system is employed by the raster image processor as part of the spot aware print workflow. The spot control system detects spot functionality corresponding to an object in this example based on object properties detected for the object, e.g., object type, color space and values, transparency information, and so on. One or more spot planes are then generated by the spot control system in order to effectuate printing of the spot functionality as part of the respective object, e.g., in order to generate one or more layers to be used to implement creation of the object by the printer device.

A determination is then made by the spot control system as to which color values to be used for the one or more spot planes, respectively, based on context data. The context data, for instance, identifies specialized inks available via the printer device, e.g., gold, metallic foil, and so forth. The context data is also configurable to identify a substrate and characteristics of the substrate, on which, the object and corresponding spot functionality is to be printed, e.g., a transparent glass surface, black fabric, and so forth. The context data, for instance, is obtained automatically and without user intervention by the spot control system as part of a handshaking protocol with the printer device, received as user input via a user interface, and so forth.

Based on this context data, the spot control system is configured to determine the color values, automatically and without user intervention. Consider a scenario in which an object is to be printed on a transparent substrate, e.g., an outline of a flower on a drinking glass. The spot control system determines an underlying plane (as one of the spot planes) is to be generated in order to reduce an effect of the transparency of the substrate on visibility of the object. In this example, the spot control system configures the underlying plane to have colors (e.g., as contrasting or complementary to colors of the object) to be used to generate the object, e.g., a white layer over which a red object is to be printed. In this way, visibility of the object is increased when applied to the substrate.

As part of this, the spot control system is also configurable to support specialization operations. The specialization operations, for instance, are configurable to control a size of the underlying plane with respect to other color planes to be used to render the object. In another example, this is usable to produce artistic effects, e.g., feathering. A choke operation, for instance, is configured to have a size of the spot plane match or less than a size of other color planes by shrinking the spot plane across boundaries e.g., to reduce visibility of the underlying spot plane. In contrast, a spread operation is configured to specify a size of the spot plane as greater than a size of other color planes of the object by expanding the spot plane across boundaries, such that the underlying plane is visible. In another example, a stroke operation is employed that configures the spot plane as an outline of respective parts of the object. Other examples are also contemplated, including artistic effects including feathering, use of multiple layers to implement a three-dimensional effect (e.g., emboss), variations of tint in support of a feathering effect, and so forth.

The spot control system also supports preview functionality that is configured to recreate a visual effect of the spot with respect to the object as rendered based on the context data. The spot control system, for instance, is configured to merge uses of process inks for each color plane with special effects of a spot plane to support a specialized appearance based on ink and substrate characteristics as specified by the context data. This is usable, for instance, to support use of an underlying plane as a mask, use of a gloss or matte effect to simulate use of a varnish, a shiny effect for metallic inks, use of shadowing to depict implementation in three dimensions for an emboss effect, and so forth. In an implementation, the spot control system also supports user inputs to vary lighting conditions, viewing angles, and so forth.

The spot control system then outputs a rasterization of the digital document for printing by a print mechanism based on the color values. The color values, for instance, are configurable to indicate use of inks other than conventional process inks used by the printer device to print other objects in the digital document. As a result, the spot control system is configurable to support specialized functionality supported by separate treatment of the spot functionality and associated objects from conventional process colors by leveraging this spot awareness. The spot control system also supports specialized functionality to configure the spot functionality, including control of a size of an underlying layer with respect to other color planes generated to implement the object and supports preview functionality to leverage effects in order to recreate an appearance of the spot functionality as part of the object in a user interface. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ spot aware print workflow techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including a digital document 106 stored in a storage device 108. The digital document 106 is configurable in a variety of ways, an example of which is in a portable document format 110 as having a plurality of objects 112.

The portable document format 110 specifies an arrangement of parts of the document within a file. The portable document format 110, for instance, is configurable to include a header, the plurality of objects 112 and a cross-reference table. The header is configurable to include a "magic number" (e.g., incorporating file type metadata that uniquely identifies the file format) and an indication of a format version. In one example, the plurality of objects 112 are arranged according to a carousel object structure (COS) specifying a file tree. The objects 112 are configurable as Boolean values, real numbers, integers, strings, names, arrays, dictionaries, streams, null objects, and so forth. Object types include direct objects that are embedded in another object and indirect objects that are numbered with an object number and a generation number. Indirect objects are implemented in one example as object streams. The cross-reference table is located near the end of the file and specifies an offset of the objects 112 within the digital document 106. The cross-reference table, for instance, specifies a byte offset of each indirect object starting at a beginning of the digital document 106.

The computing device 102 and a printer device 114 in the illustrated example implement a print pipeline including a print engine 116 that is communicatively coupled 118 (e.g., wired or wirelessly) with a print mechanism 120. The print mechanism 120 is configurable as a laser printer, LED printer, melted wax printer, dye-sublimation printer, and so on that is configured to employ resources 122 and corresponding substrates 124 to print the digital document 106. Other examples are also contemplated, including three-dimensional printers and so forth. Although the print engine 116 is illustrated as implemented by the computing device 102, functionality of the print engine is also configurable as part of the printer device 114.

The print engine 116 includes a raster image processor 126 (RIP). The raster image processor 126 is configured to rasterize the digital document 106 (e.g., as a bitmap) for rendering by the print mechanism 120 of the printer device 114. This is usable, for instance, to convert mathematical representations of objects 112 (e.g., vector objects) included in the digital document 106 into bitmaps that are then printed using resources 122 of the printer device 114 by the print mechanism 120 onto respective substrates 124.

The print mechanism 120 is configured to employ a variety of resources 122 as part of printing the digital document 106 to the corresponding substrates 124. Examples include inks configured to produce process colors, such as cyan, magenta, yellow, and key (black) ink for CMYK, RGB colors, and so forth. The resources 122 also support spot colors (e.g., gold, metallic foil, varnish, orange, and so forth) which are specialized for use with the printer device 114.

A "spot" and "spot functionality" refers to an object in the digital document 106 that is independent of those inks used to produce process colors. In other words, spot functionality is a dependent on specific functionality of a printer device 114, e.g., employs a specialized spot color such as gold, metallic foil, a varnish, and so forth. As such, spot functionality as part of implementing a respective object is configurable in a variety of ways, which includes scenarios in which the spot functionality does or does not directly contribute to a color in an intended result when printed. The spot functionality, for instance, is configurable to support special effects, materials, and so on that do not behave in a same way as typical process colors, including how the spot functionality combines with other colors, how the spot functionality responds to light, and so forth.

Conventional techniques used to implement spot functionality, however, involve an often tedious manual process in which a designer adds information to a digital document, thereby editing the document for use with this specialized functionality. In conventional techniques, use of specialized inks is limited to individual editing of objects within a document, which involves identifying respective objects and then adding information to those objects within the document. Additionally, conventional techniques do not support specialized behaviors to be used as part of rendering the objects, do not support preview functionality, and do not support use of specialized functions with respect to the spots.

Accordingly, the raster image processor 126 in the illustrated example includes a spot control system 128 representative of functionality to detect spot functionality associated with the objects 112, and from this, process the spot functionality as part of an object based on a context for rendering by the printer device 114. The spot control system 128 is configured to receive inputs specifying a context, in which, objects detected in the digital document 106 are to be printed. The context, for instance, specifies available resources 122 (e.g., inks) are usable to print the digital document 106 to respective substrates 124 by the printer device 114.

To do so, the spot control system 128 is configurable to automatically generate spot functionality with corresponding color values for objects in a digital document which are eligible for specialized spot generation. This is performable, for instance, by the spot control system 128 based on an object type and color space specified for the objects 112 within the digital document 106.

The spot control system 128 is also configurable to support specialized functionality supported by separate treatment of the spot functionality as part of rendering a respective object from conventional process colors by leveraging this spot awareness. The spot control system 128 also supports specialized functionality to configure the spot functionality, including control of a size of an underlying layer with respect to other color planes generated to implement the object, e.g., to support choke, spread, feather, or stroke operations. The spot control system 128 is also configurable in support of preview functionality to leverage visual effects in order to recreate an appearance of the object as having the spot functionality in a user interface 130 displayed by a display device 132, e.g., to provide a specialized appearance in a preview based on characteristics of inks and substrates to be used to print the object.

The spot control system 128, for instance, receives a digital document 106 for printing by a printer device 114, and from this, detects an object as involving spot functionality. To do so, the spot control system 128 examines object properties of the respective objects, e.g., object type, color space and values, transparency information, and so on. The spot control system 128 also obtains context data describing a context, in which the object and respective spot functionality is to be printed as part of the digital document. The context data describes resources 122 available to print the object (e.g., inks), substrates 124, on which, the object is to be printed, and so on.

In an example, the object includes lighter colors that are to be printed on a substrate that is black in color. Accordingly, the spot control system 128 in this example generates an underlying plane 134 as a "spot plane" that is to be disposed as a printed layer between the substrate and ink for one or more color planes used to print the object. This acts in this example to generate the underlying plane 134 to have a contrasting color to control visibility of the substrate through the spot plane. As a result, the object is configured to "stand out" through use of the spot plane and reduce visual artifacts that otherwise would be encountered as a result of printing on the substrate. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Spot Aware Print Workflow

The following discussion describes spot aware print workflow techniques that are implementable utilizing the previously described systems and devices. Aspects of each of the procedures are implemented in hardware, firmware, software, or a combination thereof. Procedures are shown as a set of blocks that specify operations performed by one or more devices and are not necessarily limited to the orders shown for performing the operations by the respective blocks. In portions of the following discussion, reference will be made to FIGS. 1-8 in parallel with a procedure 900 in an example implementation as depicted in FIG. 9.

Figure 2:
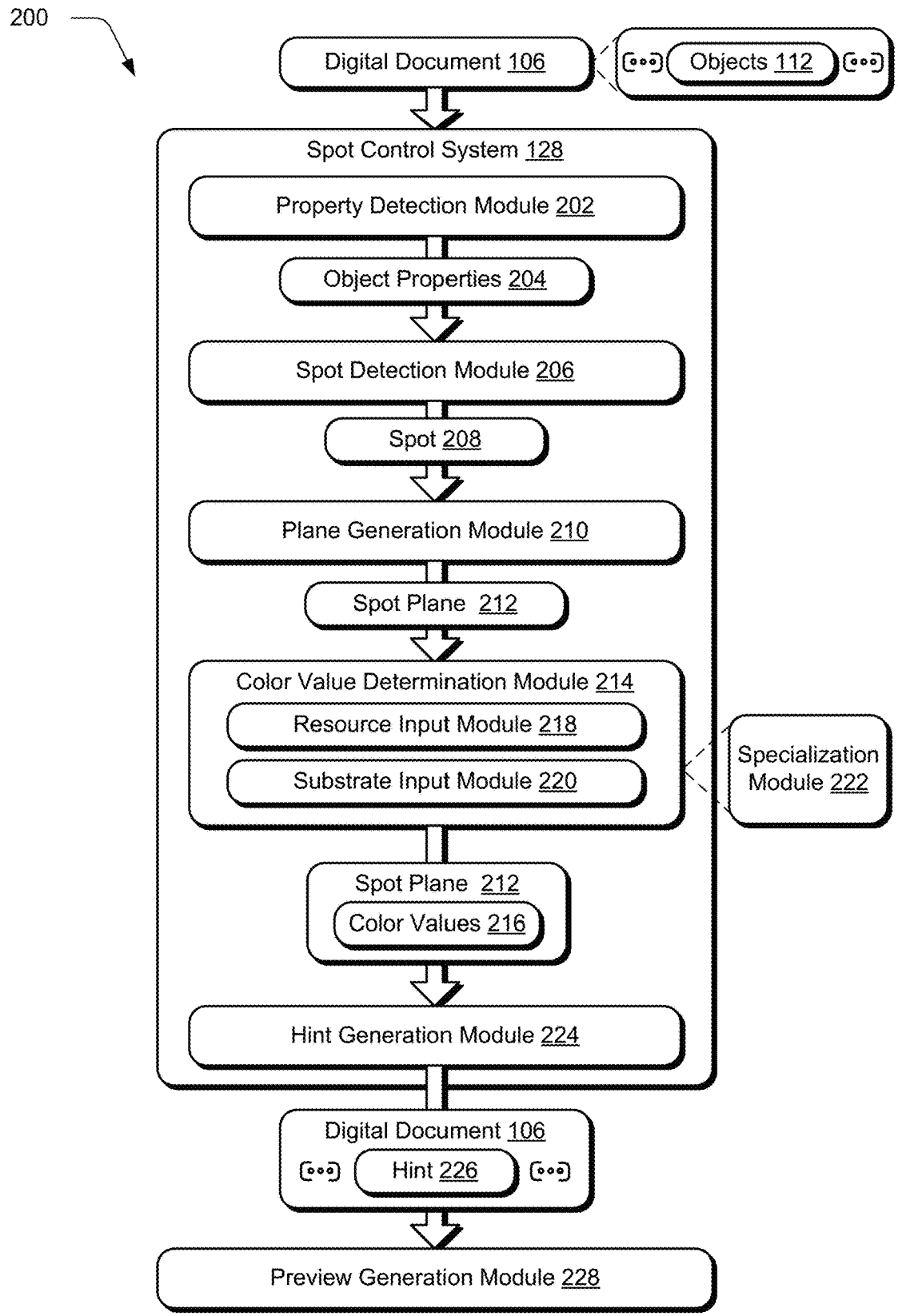
FIG. 2 depicts a system in an example implementation showing operation of a spot control system of FIG. 1 in greater detail.

FIG. 2 depicts a system 200 in an example implementation showing operation of the spot control system 128 of FIG. 1 in greater detail. To begin in this example, a digital document 106 is received for printing. The digital document 106 includes a plurality of objects 112 (block 902), e.g., vector objects, text, digital images, graphics, raster objects, and so forth. The digital document 106, for instance, is received by a print engine 116 and a raster image processor 126 is employed to rasterize the digital document 106 (e.g., as a bitmap) for printing by a printer device 114. As part of this, a spot control system 128 is utilized by the raster image processor 126 to automate processing of spot functionality as part of objects 112 included as part of the digital document 106.

To do so, a property detection module 202 of the spot control system 128 detects object properties 204 of respective objects 112 in the digital document 106. Examples of object properties include object type (e.g., digital image, vector object, etc.), a color space (e.g., whether process or non-process) and values in that color space used by the respective objects 112, transparency information indicative of a relative amount of translucence for respective portions of the objects 112, and so forth. The object properties 204 are then passed as an input to a spot detection module 206.

The spot detection module 206 is representative of functionality to detect spot functionality as corresponding to a respective object of the plurality of objects 112 based on the object properties 204 detected for the respective object (block 904). Spot functionality, as previously described, refers to an object 112 in the digital document 106 that is independent of those inks used to produce process colors. In one example, spot functionality refers to added ink that is independent of those inks used to produce process colors. As such, spot functionality is a dependent on specific functionality of a printer device, e.g., employs a specialized spot color such as gold, metallic foil, a varnish, and so forth. Accordingly, in order to detect spot functionality as part of an object the spot detection module 206 is configured to detect use of specific functionality "outside" of functionality to produce process colors, i.e., specifies specialized processing to be used to print the object. Thus, spot functionality is configurable in a variety of ways, which includes scenarios in which the spot functionality does or does not directly contribute to a color in an intended result when printed. The spot functionality, for instance, is configurable to support special effects, materials, and so on as part of the object that do not behave in a same way as typical process colors, including how a spot plane combines with other color planes, how the object having the spot functionality responds to light, and so forth.

A plane generation module 210 is then employed by the spot control system 128 to generate one or more spot planes 212 for the spot functionality identified for a respective object 208 (block 906). The spot plane 212, for instance, specifies a location within the digital document 106 that corresponds to the object. The spot plane 212 is configurable as a mask specifying a portion of the digital document 106 that corresponds to the object and associated spot functionality (and therefore specialized functionality) as opposed to other portions of the digital document 106 that are to be rendered using process colors. The spot plane 212, for instance, is a separate plane as opposed to color planes used to print the object, and have values marked wherever warranted based on eligible objects and color values. This is also includable to form a plurality of spot planes, e.g., in support of different inks and other functionality using a plurality of layers.

A color value determination module 214 is then employed to generate color values 216 for the spot plane based on context data describing a context, in which, the spot plane is to be printed (block 908). The color value determination module 214, for instance, includes a resource input module 218 that is configured to identify resources 122 available via the print mechanism 120 to print the digital document 106. This includes determining process colors that are available (e.g., CMYK, RGB) as well as non-process colors, i.e., spot colors that are printer dependent colors such as gold, metallic foils, varnishes, and so forth. The substrate input module 220 is configured to receive inputs describing characteristics of a substrate 124, on which, the digital document 106 is to be printed. This includes color of the substrate, materials to be used as the substrate, amount of translucence of the substrate 124, and so forth. Thus, characteristics of the resources 122 and the substrate 124 are usable by the color value determination module 214 to generate color values for respective pixels to be included as part of the bitmap for the spot plane 212.

The color values 216 are includable as part of rendering the digital document 106 in a variety of ways. In a first example, the respective spot plane is generated as a separate bitmap (e.g., raster plane) similar to color planes after compositing, which is used by the printing device to generate the objects having the spot functionality. In another example, the spot plane 212 is composited with additional spot planes to generate a final color of the spot planes.

In an implementation, generation of the spot plane 212 and color values 216 by the color value determination module 214 is configured to generate an underlying plane. The object 112 is detected as a "spot" as involving a conflict that is likely to result in a visual artifact. Identification of a substrate 124 as having a greater than a threshold amount of transparency, for instance, is detectable as likely to affect visibility of a spot having color values of colors that are relatively light and/or likely partially translucent. In this scenario the plane generate module 210 is configured to generate a spot plane as an underlying layer that is configured to reduce and even eliminate interference of the substrate 124 with visibility of the ink.

Figure 3:
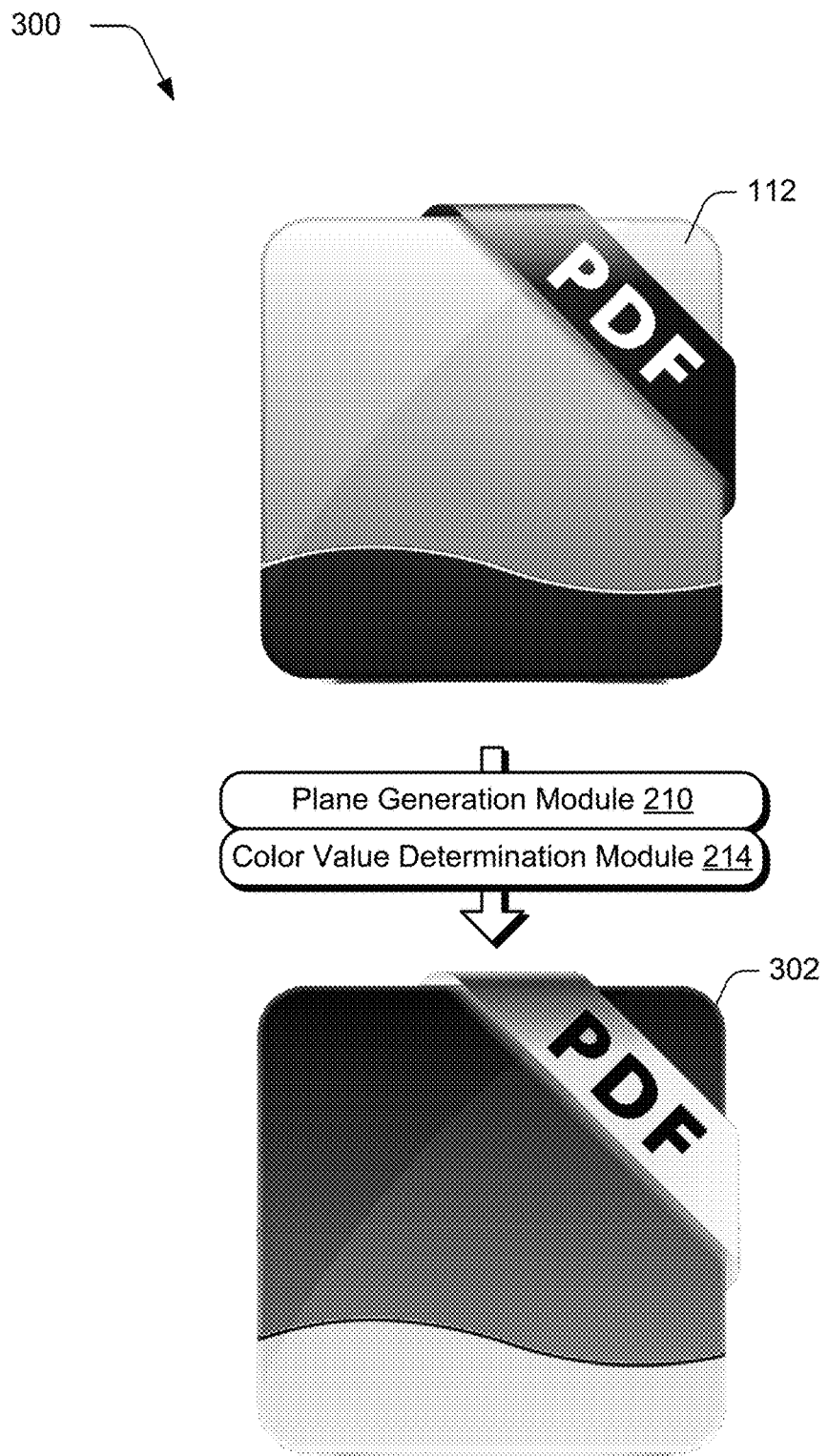
FIG. 3 depicts an example implementation showing operation of plane generation module and color value determination module of FIG. 2 to generate an underlying layer.

FIG. 3 depicts an example implementation 300 showing operation of the plane generation module 210 and color value determination module 214 to generate an underlying layer. The object 112 in this instance is configured for rendering using relatively light colors, e.g., light red, orange, and so forth. These colors are detectable by the color value determination module 214 as permitting visibility of a color of the substrate 124.

Accordingly, the plane generation module 210 and color value determination module 214 are configured to generate the spot plane as an underlay layer 302 that acts as a buffer to reduce and even eliminate an effect of the substrate 124 on visibility of the object 112. In the illustrated example, this is performed by generating color values (and shades) for the underlay layer 302 that are in contrast to colors of the object 112. This operates to assist in isolating an appearance of the object 112 from an effect of the substrate 124 when printed on the substrate by having this spot plane, acting as an underlay layer, disposed between a color plane used to print the object 112 and the substrate 124 by the print mechanism 120. A variety of other examples are also contemplated, such as to use complementary colors, shades, and so forth.

Figure 4:
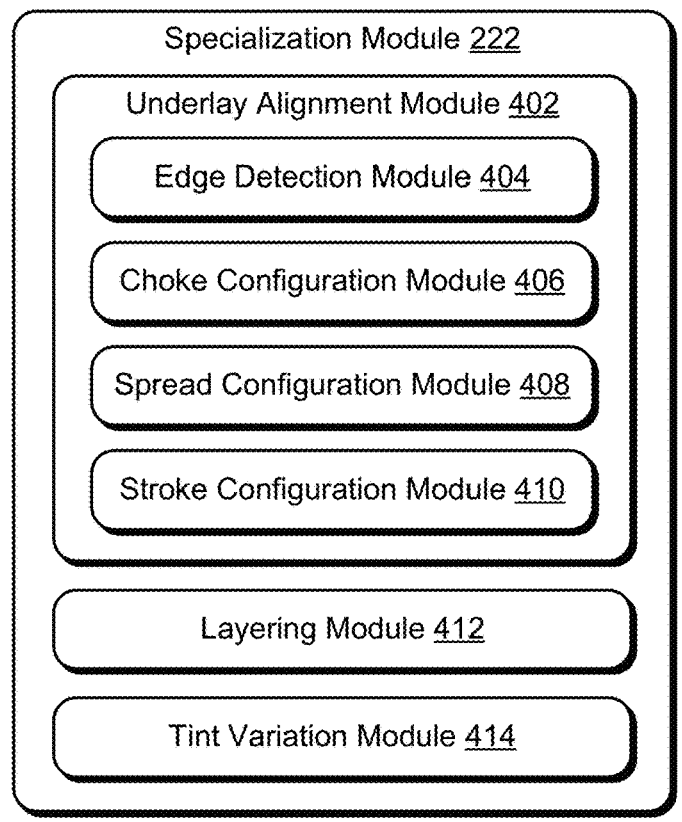
FIG. 4 depicts an example implementation showing operation of a specialization module as implementing specialized operations as part of rendering spot functionality for a respective object.

The color value determination module 214 is also configurable to include a specialization module 222 that represents functionality to perform specialization operations are part of rendering the spot by the spot control system 128. FIG. 4 depicts an example implementation 400 showing operation of the specialization module 222 as implementing specialized operations as part of spot rendering. The specialization module 222 is configured to support additional functionality usable to control how the spot is rendered and subsequently printed by the printer device 114.

In a first example, an underlay alignment module 402 employs an underlay alignment module 402 to control a size of the underlying spot plane with respect to other color planes used to implement the object as having spot functionality. The underlay alignment module 402, for instance, includes an edge detection module 404 configured to detect edges within content included within the spot. Based on the type of resource 122 (e.g., ink), the underlay alignment module 402 then selects a specialized operation.

A choke configuration module 406, for instance, is utilized to ensure that the underlaying spot plane is not visible and/or has limited visibility as printed beneath a color plane. A spread configuration module 408, on the other hand, is used to ensure that the underlying spot plane is visible. This is also usable for implementing the spot plane as an overlay, e.g., to ensure that varnish is spread over an entirety of inks used to print the color planes of the object, itself.

Figure 5:
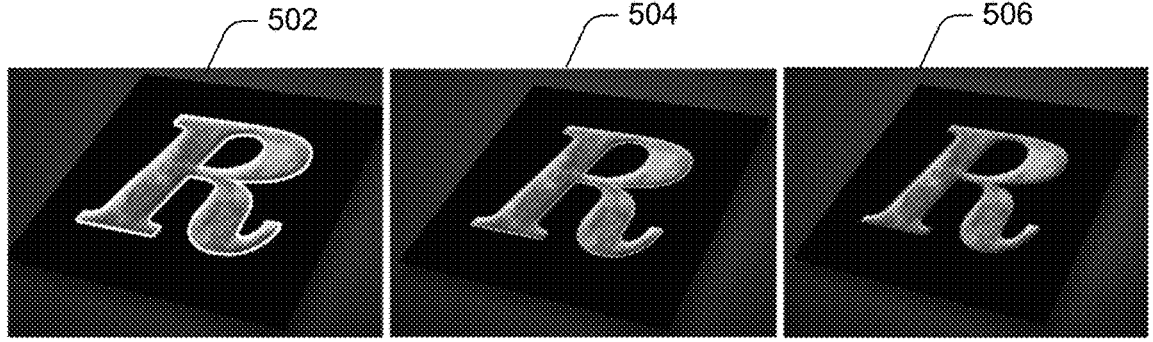
FIG. 5 depicts an example implementation of choke and spread operations.

FIG. 5 depicts an example implementation 500 of choke and spread operations. In a first example, 502, a spread operation is employed such that an underlying plane is visible, e.g., is greater in size than a color plane printed over it to show white as a border outside of edges detected for an object as a letter "R" in the illustrated example. In a second example 504, a choke operation is used by the choke configuration module 406 to limit visibility of the underlying layer. In a third example 506, the underlying layer is hidden from visibility through printing of another color plane representing a respective object 112.

Returning to a discussion of FIG. 3, a stroke configuration module 410 is representative of functionality to provide a stroke along edges detected by the edge detection module 404. This is usable, for instance, to reduce and eliminate visual artifacts caused by inks along the detected edges.

Figure 6:
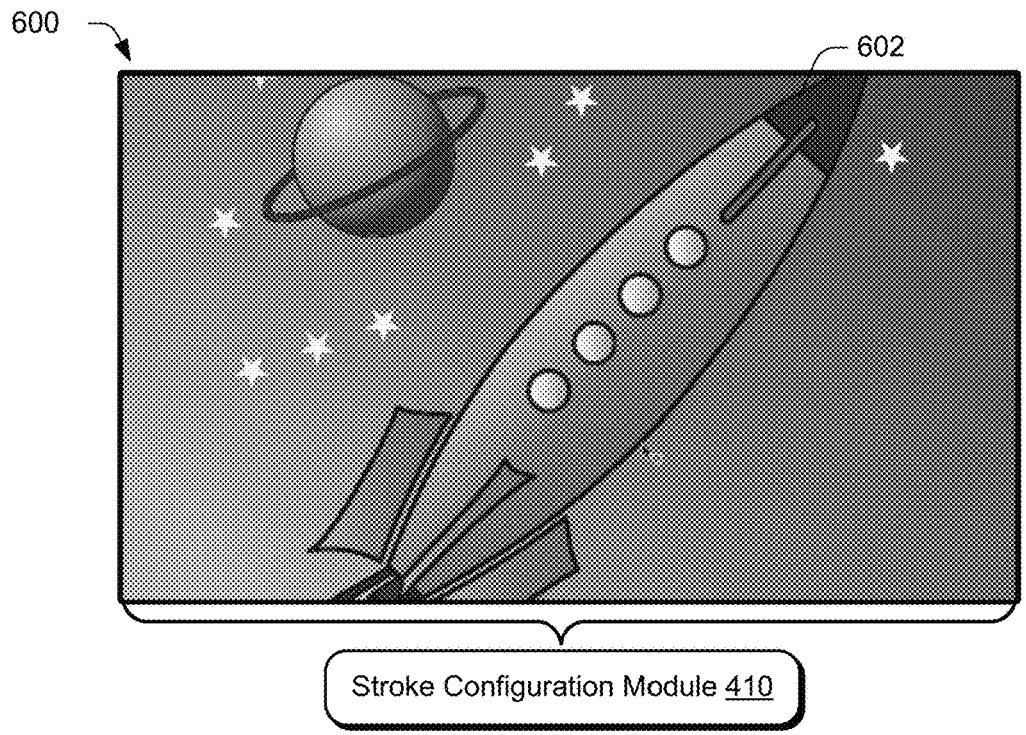
FIG. 6 depicts an example implementation of a stroke configuration module of FIG. 4 as adding strokes along edges detected within an object.

FIG. 6 depicts an example implementation 600 of a stroke configuration module 410 of FIG. 4 as adding strokes along edges detected along an object 602. The strokes are depicted as dark lines providing borders along the edges of the object 602. This functions to separate inks from each other (e.g., specialized from process inks) and reduces visual artifacts that otherwise may cause bleeding and other visual artifacts along these edges.

Figure 7:
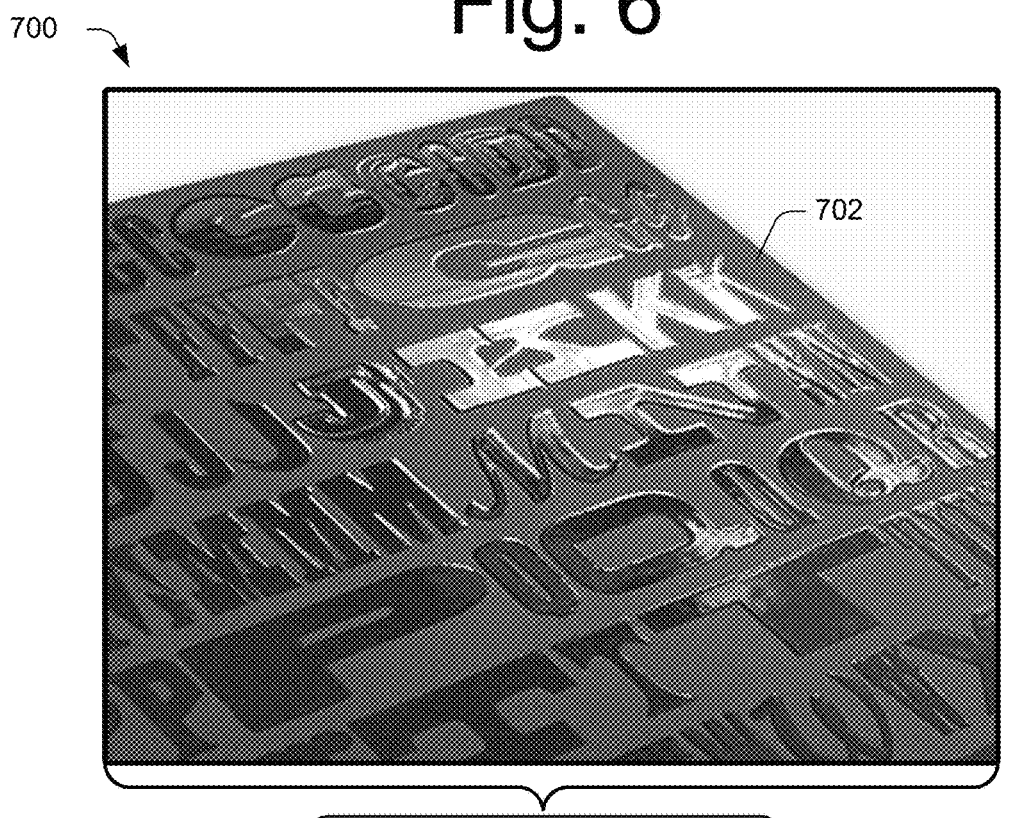
FIG. 7 depicts an example implementation in which spot functionality specifies an emboss effect for varnish, which is achieved by generating a plurality of spot planes as layers to be applied as the same spot.

The specialization module 222 is also configurable to support a variety of other specialized functions. In another example, a layering module 412 is employed to control generation of multiple layers, e.g., as additional spot planes to print the object 112. This is usable to provide a three-dimensional effect to the object, e.g., to appear embossed, use "puff" inks or varnish to provide tactile feedback when printed, and so forth. FIG. 7 depicts an example implementation 700 in which an object 702 employs an emboss effect as part of spot functionality for varnish, which is achieved by generating a plurality of spot planes as layers to be applied over color planes used to print the object 702.

In a further example, a tint variation module 414 is employed by the specialization module 222. The tint variation module 414 is configured to perform operations that vary a tint of the spot planes, e.g., to apply a feathering effect using a linear or other transformation. Other examples of implementation of specialized operations are also contemplated, e.g., to vary amounts of translucence, mixing of inks, and so forth.

Returning again to the discussion of FIG. 3, a hint generation module 224 is also implemented by the spot control system 128 to support generation of a hint 226 usable to control "how" the spot is printed by the print mechanism 120 of the printer device 114. This is usable, for instance, to add the hint 226 to both differentiate processing of the spot plane as using resources 122 that are different that conventional resources (e.g., process inks) used in typical usage scenarios to print color planes of the object. This is also usable to address particular characteristics of these resources 122 when printing the spot plane.

The hint 226, for instance, is configurable cause the print mechanism 120 to avoid overprint interaction of a respective spot plane. The hint 226 is also configurable to control further processing of the hint, e.g., the print mechanism 120 is to avoid color management for the respective spot plane, avoid use of a particular blending rule for a respective spot plane, and so forth. The hint 226 is also usable to specify use of ink specific rules for the respective spot plane, adjust tint for the respective spot plane based on transparency, and so on. In this way, the hint 226 is provided as an output as part of rendering of the 106, but is not made as an edit to the actual digital document 106, thereby preserving operation of functionality of the digital document 106, e.g., for use by other printer device 114 that do not include this functionality.

A preview generation module 228 is then employed in the system 200 of FIG. 2 to generate a preview for display of the spot in a user interface as part of the digital document based on the color values (block 910). The preview generation module 228, for instance, is utilized to simulate inclusion of the spot plane as part of the document and mimic how the spot plane and associated spot functionality is to appear when printed using the specified resources 122 and substrate 124 as part of a respective object.

Figure 8:
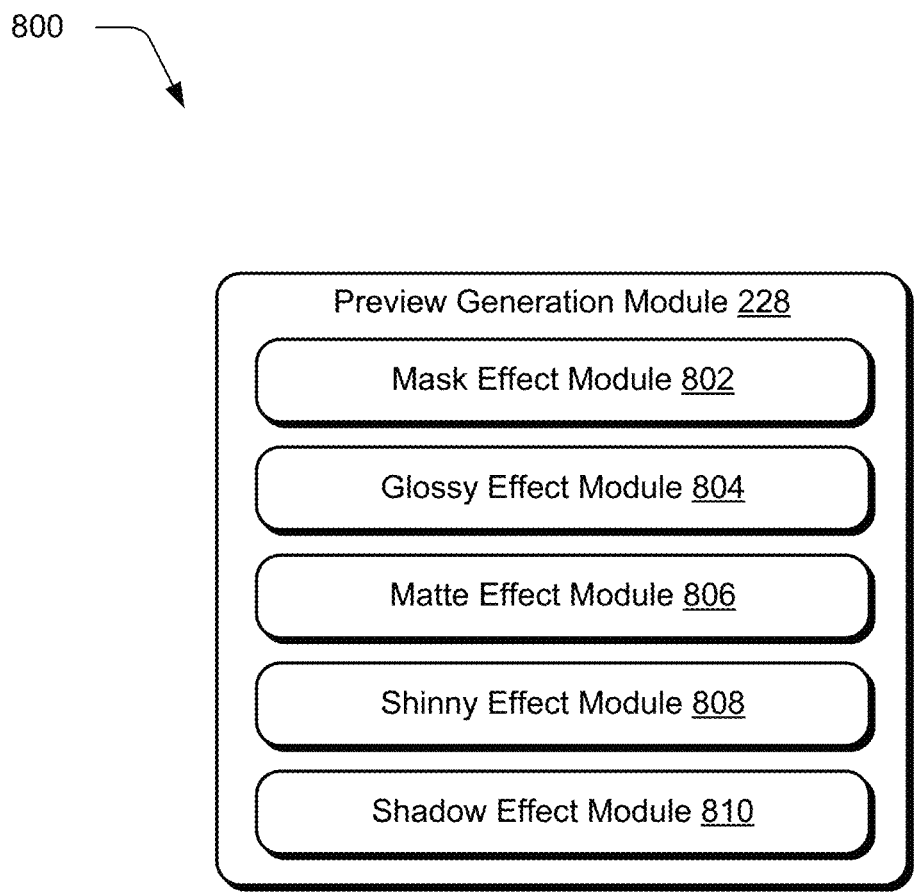
FIG. 8 depicts an example implementation showing functionality usable by a preview generation module to generate a preview.
Figure 9:
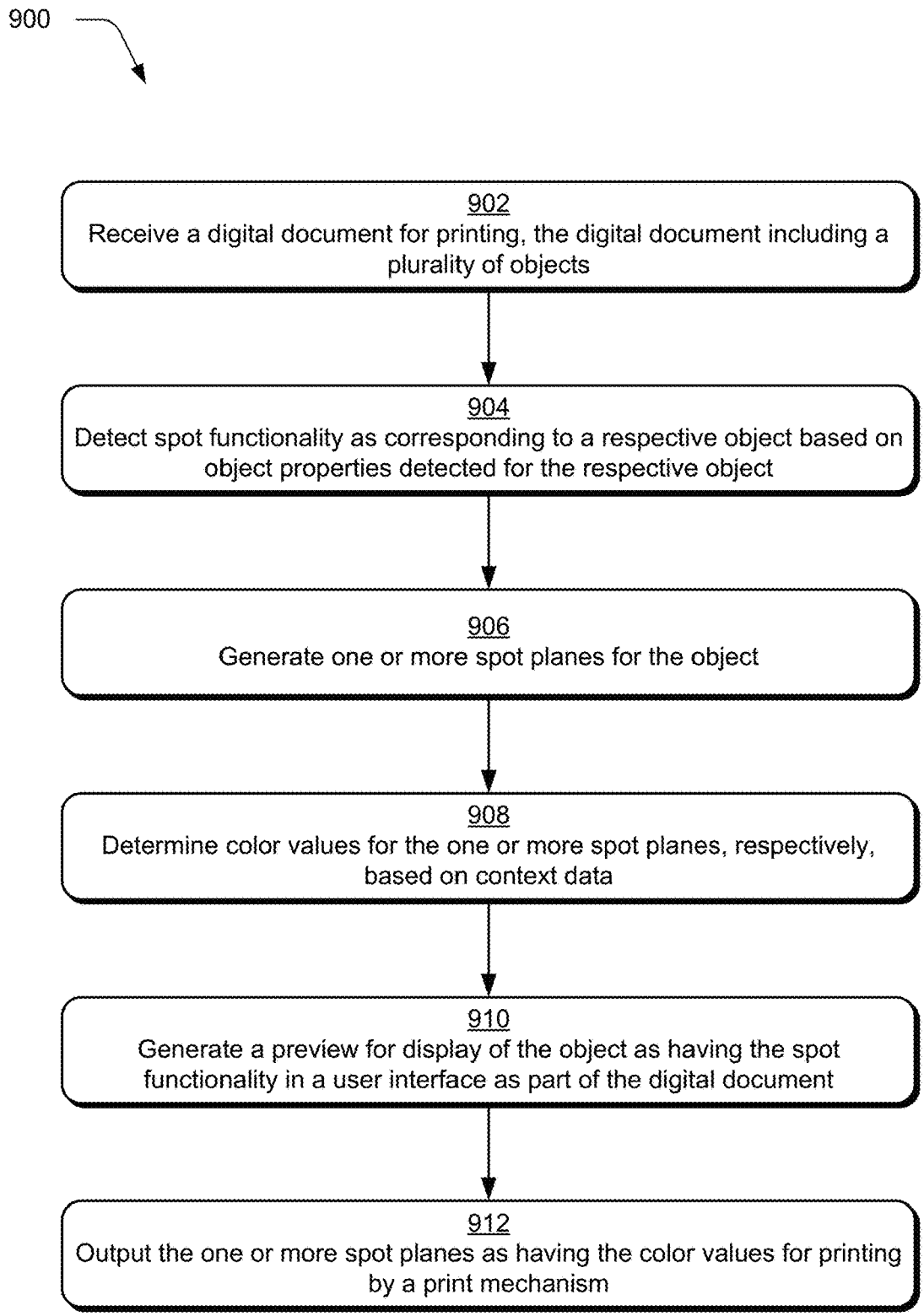
FIG. 9 is a flow diagram depicting a procedure in an example implementation of a spot aware print workflow.

FIG. 8 depicts an example implementation 800 showing functionality usable to the preview generation module 228 to generate the preview. The preview generation module 228 is configurable to employ a variety of operations to generate the preview of the object as having the spot functionality. Illustrated examples include a mask effect module 802 representative of a masking operation, a glossy effect module 804 representative of an operation to provide a glossy appearance, a matte effect module 806 representative of functionality to provide a matte appearance to the spot, a shiny effect module 808 to implement an appearance of a shine to the spot, a shadow effect module 810 to provide a shadow effect, and other effects. This is usable by the spot control system 128 to support a preview of a variety of types of spot functionalities as applied to the objects.

The preview generation module 228, for instance, is configured to simulate a preview of the object as having the spot functionality by merging the spot planes with process color planes "outside" of the spot planes in the digital document 106 and then highlight the characteristics of the spot planes based on the effects supported by the preview generation module 228. In order to simulate a varnish ink, for instance, a glossy or matte effect is employed based on a type of varnish. Metallic inks are given a shiny effect, puff inks are shown using a shadow effect to emulate an emboss effect, and so forth.

After generation of the preview in this example, the one or more spot planes are output for printing by a print mechanism (block 912), e.g., as a bitmap. As a result, the techniques described herein support automated generation of spots, specialized operations, and hints to overcome conventional challenges and improve operational efficiency and image accuracy as a spot aware print workflow.

This is also extendable to support a variety of additional scenarios. In a first such example, internal spot generation is supported, e.g., to apply varnish for each identified type of object inside an image to give the feel when touching the printed substrate, e.g., to use a varnish to give texture to an orange. This is performable using object detection and image segmentation implemented using machine learning. Each segment is then analyzed by the system to determine whether a spot is to be generated. In a second example, inputs are support that specify processing for spots having specific colors.

Example System and Device

Figure 10:
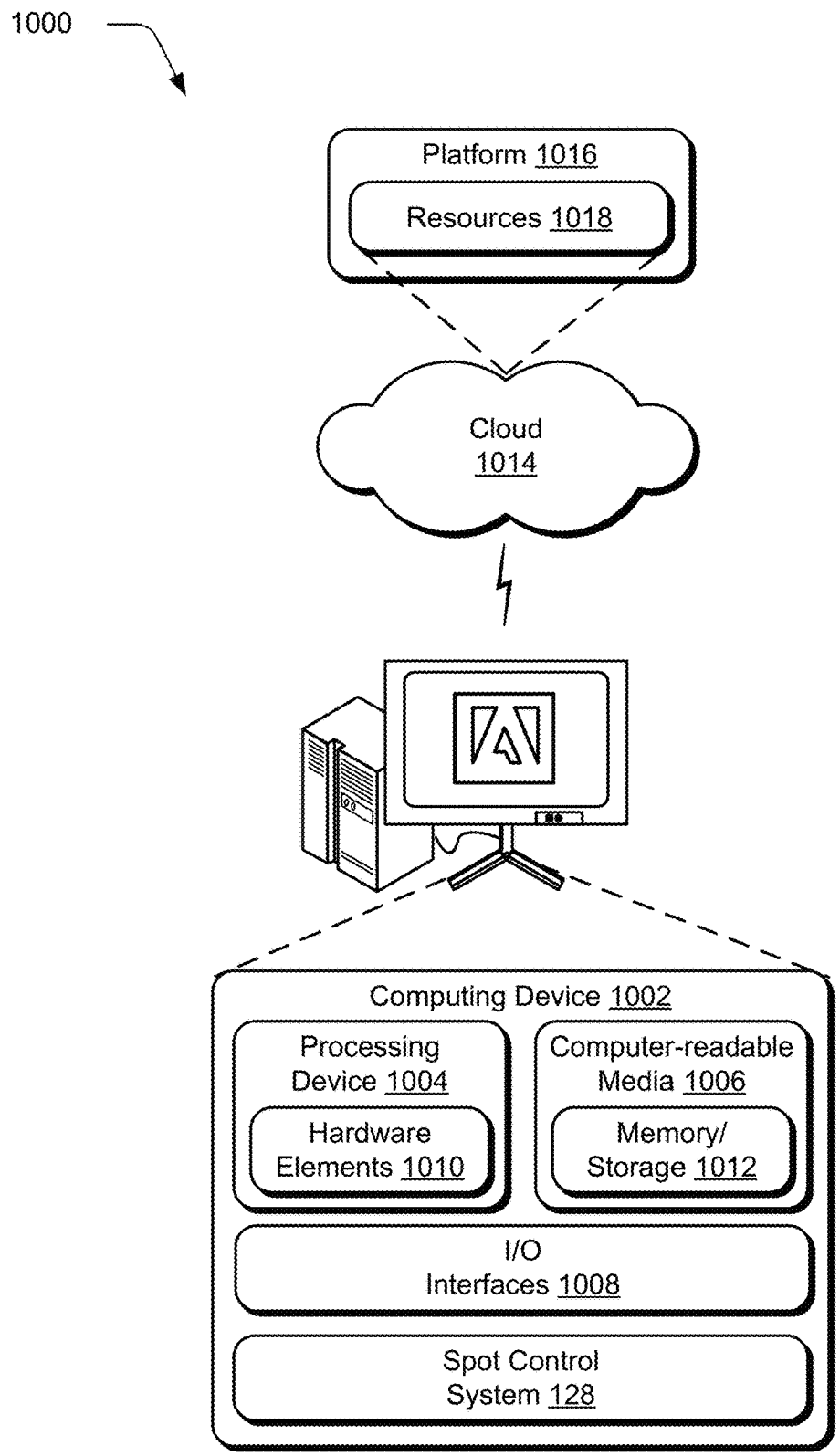
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the spot control system 128. The computing device 1002 is configurable, for example, as a server of a service provider, a device associated with a client (e.g., a client device), an on-chip system, and/or any other suitable computing device or computing system.

The example computing device 1002 as illustrated includes a processing device 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1004 is representative of functionality to perform one or more operations using hardware. Accordingly, the processing device 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012 that stores instructions that are executable to cause the processing device 1004 to perform operations. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing device 1004. The instructions and/or functions are executable/operable by one or more articles of manufacture (for example, one or more computing devices 1002 and/or processing devices 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

In implementations, the platform 1016 employs a "machine-learning model" that is configured to implement the techniques described herein. A machine-learning model refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a digital document for printing, the digital document including a plurality of objects;
detecting, by the processing device, a spot functionality corresponding to an object of the plurality of objects based on object properties detected for the object;
generating, by the processing device, one or more spot planes for the object based on a detected edge of the object and the object properties, including an object type and a color space;
determining, by the processing device, color values for the one or more spot planes, respectively, based on context data describing a context, in which, the one or more spot planes are to be printed;
determining, by the processing device, a size for the one or more spot planes, with respect to at least one other color plane of the object and based on the detected edge of the object;
generating, by the processing device, a hint instruction that differentiates the spot functionality and the object from other objects of the plurality of objects in the digital document and preserves functionality of the digital document;
outputting, by the processing device, the one or more spot planes as having the color values and the size for printing by a print mechanism; and
outputting, by the processing device, the hint instruction to the print mechanism.

2. The method as described in claim 1, wherein the one or more spot planes is configured as an underlying plane.

3. The method as described in claim 2, wherein a color of a color value of the underlying plane is configured to reduce transmission of an appearance of a color of a substrate as effecting a color of the color value of the object when printed on the substrate.

4. The method as described in claim 2, wherein the underlying plane is a white underlying plane or a varnish plane.

5. The method as described in claim 1, wherein the context is based on ink characteristics to be used to print the spot functionality.

6. The method as described in claim 1, wherein the context specifies a color of a substrate, on which, the object is to be printed.

7. The method as described in claim 1, wherein the hint instruction differentiates ink to be used to print the spot functionality as part of the object from ink to be used to print the other objects.

8. The method as described in claim 1, wherein the hint instruction is configured to cause the print mechanism to:
avoid overprint interaction of a spot plane of the one or more spot planes;
avoid color management for the spot plane of the one or more spot planes;
avoid use of a particular blending rule for the spot plane of the one or more spot planes;
use ink specific rules for the spot plane of the one or more spot planes; or
adjust tint for the spot plane of the one or more spot planes based on transparency.

9. The method as described in claim 1, wherein the determining the color values is based at least in part on an input indicating a specialization operation.

10. The method as described in claim 1, wherein the size of the one or more spot planes is greater than a size of the at least one other color plane.

11. The method as described in claim 1, wherein the size of the one or more spot planes is configured such that an appearance of the one or more spot planes, when printed, is hidden by the at least one other color plane.

12. The method as described in claim 9, wherein the specialization operation specifies generation of a plurality of layers to provide a three-dimensional effect when printed by the print mechanism.

13. The method as described in claim 1, further comprising automatically detecting, by the processing device, the object properties in the digital document.

14. The method of claim 1, wherein the context specifies a material on which the object is printed.

15. One or more computer-readable storage media storing instructions that, responsive to execution by a processing device, causes the processing device to perform operations including:
receiving a digital document for printing, the digital document including a plurality of objects;
detecting a spot functionality as corresponding to an object of the plurality of objects based on object properties detected for the object;
generating one or more spot planes for the object based on a detected edge of the object and the object properties, including an object type and a color space;
determining color values for the one or more spot planes, respectively based on context data describing a context, in which, the one or more spot planes is to be printed;
determining a size for the one or more spot planes, with respect to at least one other color plane of the object and based on the detected edge of the object; and
generating a hint instruction that differentiates the spot functionality and the object from other objects of the plurality of objects in the digital document and preserves functionality of the digital document.

16. The one or more computer-readable storage media as described in claim 15, wherein the operations include generating a preview for display of the one or more spot planes in a user interface as part of the digital document based on the color values and based at least in part on ink characteristics to be used to print the spot functionality.

17. The one or more computer-readable storage media as described in claim 15, wherein the operations include generating a preview for display of the one or more spot planes in a user interface as part of the digital document based on the color values, and wherein the generating the preview is based at least in part on a substrate, on which, the object is to be printed.

18. The one or more computer-readable storage media as described in claim 15, wherein the operations include:
  outputting the one or more spot planes as having the color values for printing by a print mechanism; and
  outputting the hint instruction to the print mechanism.

19. A system comprising:
  a processing device; and
  a computer-readable storage medium storing instructions that causes the processing device to perform operations including:
    receiving a digital document for printing, the digital document including a plurality of objects;
    detecting a spot functionality corresponding to an object of the plurality of objects based on object properties detected for the plurality of objects, respectively;
    generating one or more spot planes for the object based on a detected edge of the object and the object properties, including an object type and a color space;
    determining color values for the one or more spot planes, respectively based on context data describing a context, in which, the one or more spot planes are to be printed;
    determining a size for the one or more spot planes, with respect to at least one other color plane of the object and based on the detected edge of the object;
    generating a hint instruction that differentiates the spot functionality and the object from other objects of the plurality of objects in the digital document and preserves functionality of the digital document;
    outputting the digital document having the color values and the size for the one or more spot planes for printing by a print mechanism; and
    outputting the hint instruction to the print mechanism.

20. The system as described in claim 19, wherein the outputting includes rasterizing the digital document and generating the one or more spot planes.

* * * * *